(12) United States Patent
Maclin, III

(10) Patent No.: US 9,511,398 B1
(45) Date of Patent: Dec. 6, 2016

(54) GRAVITY INDUCED SOIL REMEDIATION SYSTEM

(71) Applicant: Regenerative Property Solutions, LLC, Crestview, FL (US)

(72) Inventor: Henry W. Maclin, III, Franklin, AL (US)

( * ) Notice: Subject to any disclaimer, the term of this patent is extended or adjusted under 35 U.S.C. 154(b) by 0 days.

(21) Appl. No.: 15/098,408

(22) Filed: Apr. 14, 2016

(51) Int. Cl.
  *B09C 1/02* (2006.01)
  *B09C 1/00* (2006.01)
  *B09B 3/00* (2006.01)

(52) U.S. Cl.
  CPC . *B09C 1/02* (2013.01); *B09B 3/00* (2013.01); *B09C 1/002* (2013.01)

(58) Field of Classification Search
  CPC ............ B09C 1/02; B09C 1/002; B09B 3/00
  See application file for complete search history.

(56) References Cited

U.S. PATENT DOCUMENTS

| | | | | |
|---|---|---|---|---|
| 4,850,745 A | * | 7/1989 | Hater | B09C 1/10 405/128.2 |
| 4,966,654 A | | 10/1990 | Carberry | |
| 5,086,717 A | * | 2/1992 | McCrossan | B09C 1/06 110/215 |
| 5,126,048 A | * | 6/1992 | Zhang | C02F 1/28 210/511 |
| 5,398,756 A | * | 3/1995 | Brodsky | B09C 1/085 166/248 |
| 5,441,365 A | | 8/1995 | Duffney et al. | |
| 6,000,882 A | | 12/1999 | Bova et al. | |
| 6,027,284 A | | 2/2000 | Prasher et al. | |
| 6,210,078 B1 | * | 4/2001 | Redwine | B01D 61/16 134/28 |
| 6,267,534 B1 | * | 7/2001 | Schwalbe | B09C 1/00 405/128.45 |
| 6,502,633 B2 | | 1/2003 | Cooper et al. | |
| 6,827,861 B2 | | 12/2004 | Kerfoot | |
| 7,360,966 B2 | | 4/2008 | Richter | |
| 8,074,670 B2 | * | 12/2011 | Peters | B65G 5/005 137/1 |
| 2005/0109982 A1 | * | 5/2005 | Yura | B09C 1/002 252/188.1 |
| 2006/0157423 A1 | * | 7/2006 | Cleary | B09C 1/002 210/747.7 |
| 2010/0133196 A1 | * | 6/2010 | Khudenko | B01D 24/06 210/668 |
| 2013/0240420 A1 | * | 9/2013 | Robertson | C02F 3/303 210/96.1 |

* cited by examiner

*Primary Examiner* — Benjamin Fiorello
(74) *Attorney, Agent, or Firm* — Dale J. Ream

(57) ABSTRACT

A gravity induced soil remediation system for filtering waste material from a waste stream includes an upstream trench member defining an interior area. A first distribution conduit is situated in the interior area and has an inlet in communication with the waste stream and an outlet extending downstream from the upstream trench member. The first distribution conduit has a negative elevation angle between the inlet and the outlet such that the waste stream flows downwardly therebetween by the natural force of gravity. The first distribution conduit is perforated to allow a first portion of the waste stream therein to pass therethrough. The upstream trench member includes sand and carbon filter media situated in the interior area of the upstream trench member proximate the first distribution conduit to extract waste material from the first portion of the waste stream. Subsequent downward elevation trench member are connected to the first.

17 Claims, 5 Drawing Sheets

GRAVITY INDUCED SOIL REMEDIATION SYSTEM

BACKGROUND OF THE INVENTION

This invention relates generally to methods and systems for remediating contaminated soil or water and, more particularly, to a gravity induced soil remediation system for filtering dissolved solid waste material from a waste stream.

Over time, soil and associated ground water areas may become contaminated with solvents, agricultural chemicals like pesticides, industrial waste, agricultural chemicals, or other waste that is not properly disposed of. The most common soil pollutants are The most common chemicals involved are petroleum hydrocarbons, polynuclear aromatic hydrocarbons (such as naphthalene and benzopyrene), solvents, pesticides, lead, and other heavy metals. A significant problem with soil contamination has been experienced around airports where propylene glycol is used in significant amounts to de-ice airplanes at commercial airports. Propylene glycol runs off into the soil from the areas where airplanes loaded with passengers are de-iced prior to flight. The propylene glycol in the soil and water may be referred to as a waste stream and can cause health problems, destruction of property, and damage to the character and quality of the soil.

Various systems and methods have been used in the past to remediate soil or to otherwise filter or purge dissolved waste material from a water stream. For instance, large volumes of contaminated soil or water streams may be removed from an area and replaced with uncontaminated soil. In other cases, the contaminated soil may be flushed with large volumes of water under high pressure or treated with other chemicals so as reduce the effect of undesirable pollutants. In addition, activated carbon is effective in filtering pollutants from polluted air and water streams and, therefore, is frequently employed in water filtration systems and in soil remediation. However, the carbon media requires moderate to high pressure to become activated to absorb pollutants. This method may require pumps or other means to create pressure upon the carbon filter media in order to activate the carbon media to act upon the contaminants.

Although presumably effective to achieve the intended results, the existing methods for remediating contaminated soil or water are expensive, require undesirable logistics of excavating and transporting contaminated soil, or require a means for introducing pressure to activate the filtration media.

Therefore, it would be desirable to have a gravity induced soil remediation system for filtering dissolved solid waste material from a liquid waste stream. Further, it would be desirable to have a gravity induced soil remediation system having a series of trench members that each include filter media for cleaning a waste stream, each trench member being situated at a lower elevation than a previous trench member so that portions of the waste stream are moved downwardly into contact with carbon filter media by gravity rather than by a pump.

SUMMARY OF THE INVENTION

A gravity induced soil remediation system according to the present invention is installed beneath a ground surface for filtering dissolved solid waste material from a waste stream and includes an upstream trench member having an upstream end and an opposed downstream end and defining an interior area. A first distribution conduit is situated in the interior area and has a first conduit inlet in communication with a source of the waste stream and a first conduit outlet extending downstream from the downstream end of the upstream trench member.

The first distribution conduit has a negative elevation angle between the first conduit inlet and the first conduit outlet such that the waste stream flows downwardly between the first conduit inlet and the first conduit outlet by the natural force of gravity. The first distribution conduit includes a bottom wall defining a plurality of perforations configured to allow a first portion of the waste stream therein to pass therethrough. The upstream trench member includes sand and carbon filter media situated in the interior area of the upstream trench member proximate the first distribution conduit, the sand and carbon filter media configured to extract the dissolved waste material from the first portion of the waste stream.

Therefore, a general object of this invention is to provide a gravity induced soil remediation system for filtering dissolved solid waste material from a liquid waste stream.

Another object of this invention is to provide a gravity induced soil remediation system having a series of trench members situated under a ground surface to successively Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is a side view of the soil remediation system as in FIG. 1a;

FIG. 2a is a perspective view of the soil remediation system as in FIG. 1a;

FIG. 2b is a side view of the soil remediation system as in FIG. 2a;

FIG. 3a is an isolated perspective view of an upstream trench as in FIG. 2a;

FIG. 3b is an exploded view of the trench member as in FIG. 3a;

FIG. 4b is an isolated view on an enlarged scale taken from FIG. 4a;

FIG. 4c is an isolated view on an enlarged scale taken from FIG. 4a;

FIG. 4d is an isolated view on an enlarged scale taken from FIG. 4a;

FIG. 4e is an isolated view on an enlarged scale taken from FIG. 4a; and

FIG. 4f is an isolated view on an enlarged scale taken from FIG. 4a.

DESCRIPTION OF THE PREFERRED EMBODIMENT

Figure 1A:
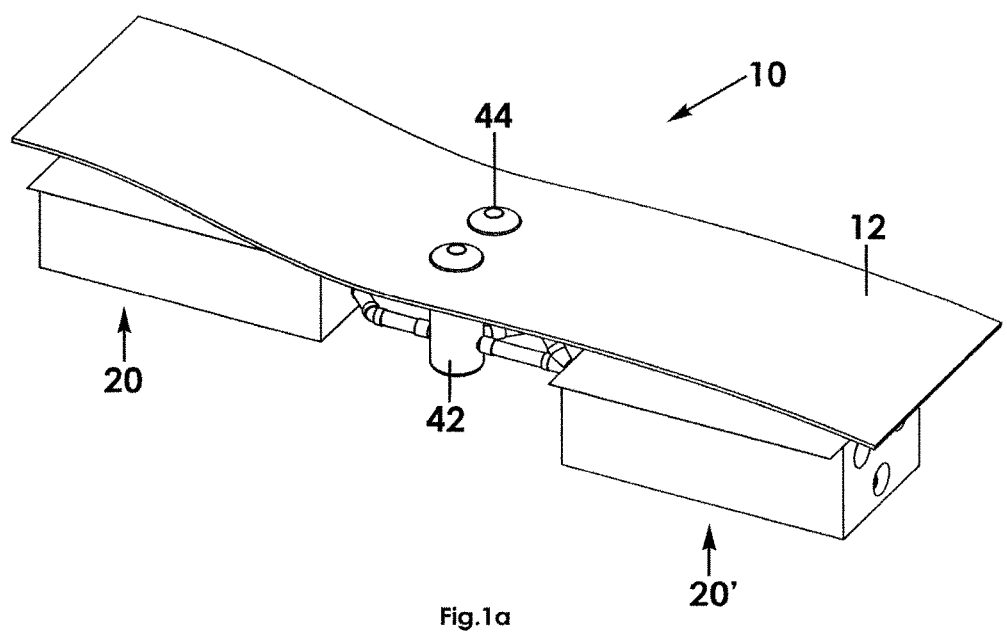
FIG. 1a is a perspective view of a gravity induced soil remediation system according to a preferred embodiment of the present invention illustrated as installed under a ground surface.
Figure 1B:
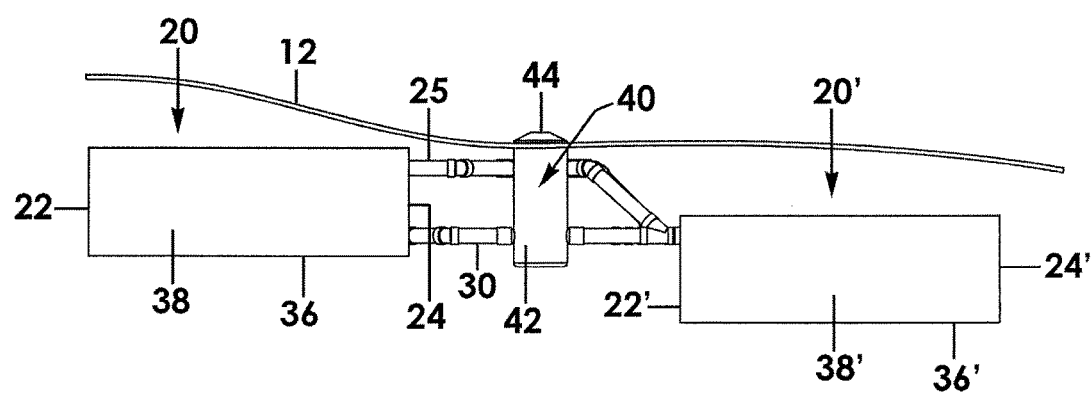
Figure 2A:
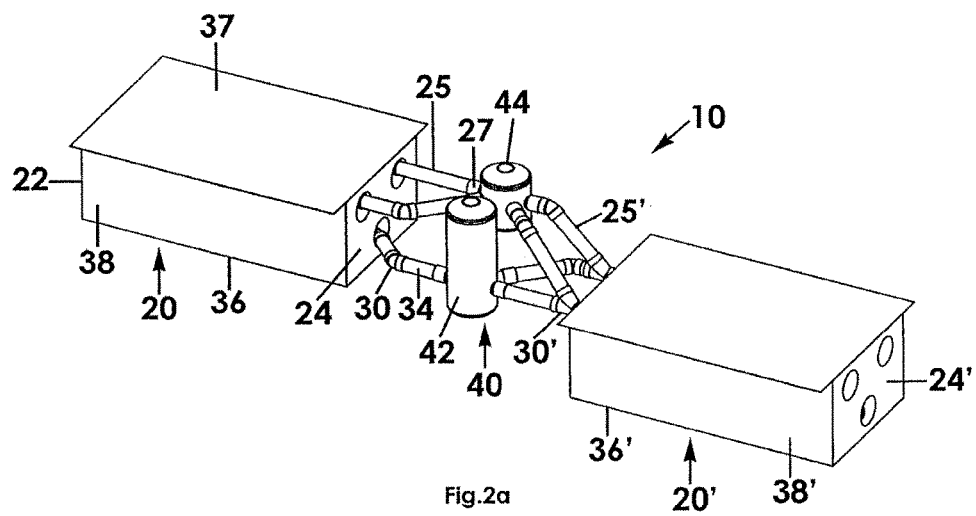
Figure 2B:
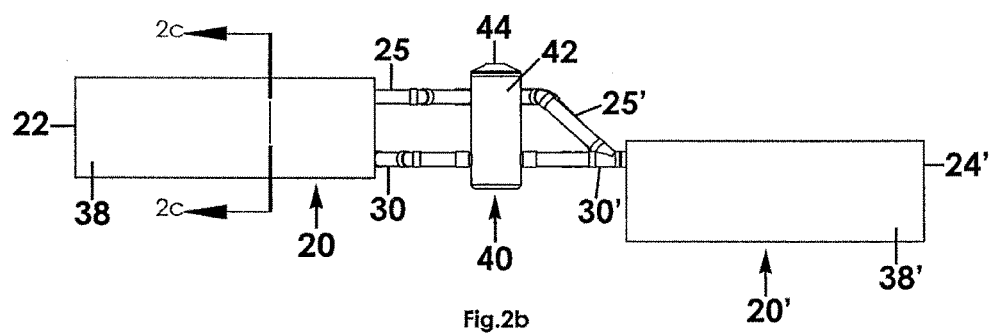
Figure 2C:
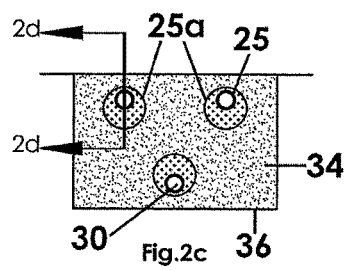
FIG. 2c is a sectional view taken along line 2c-2c of FIG. 2b.
Figure 2D:
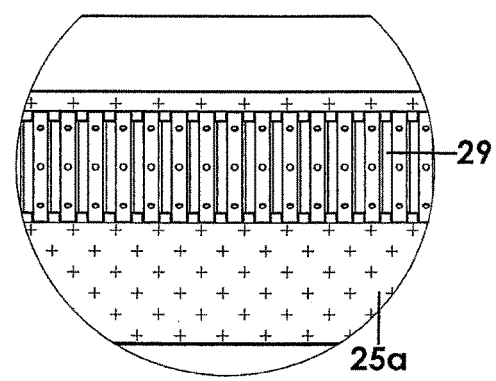
FIG. 2d is a sectional view taken along line 2d-2d of FIG. 2c.
Figure 3A:
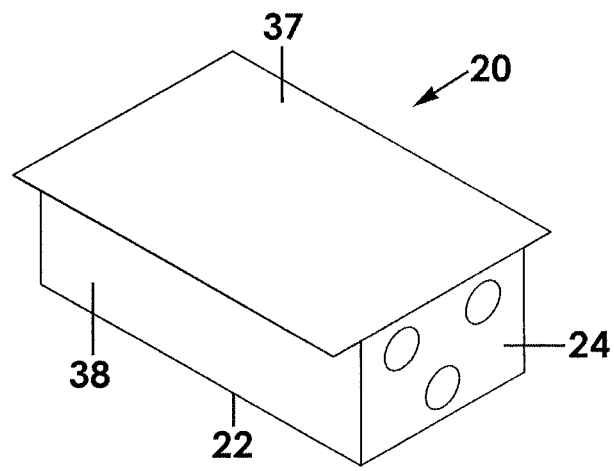
Figure 3B:
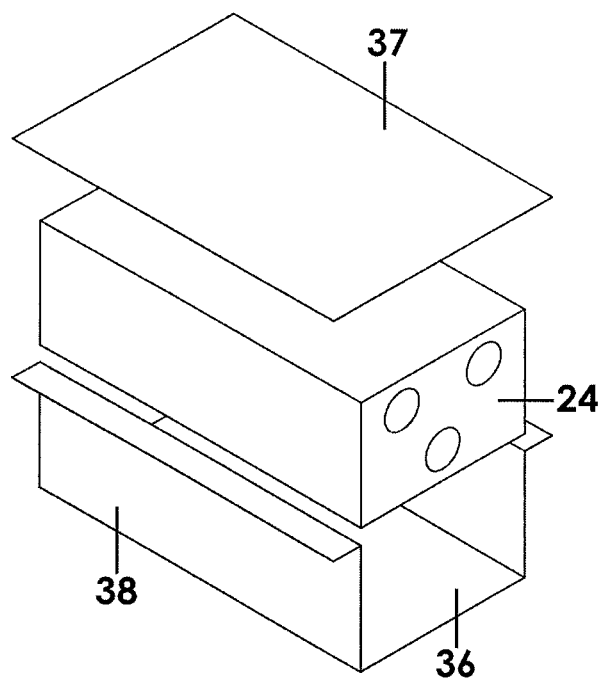
Figure 4A:
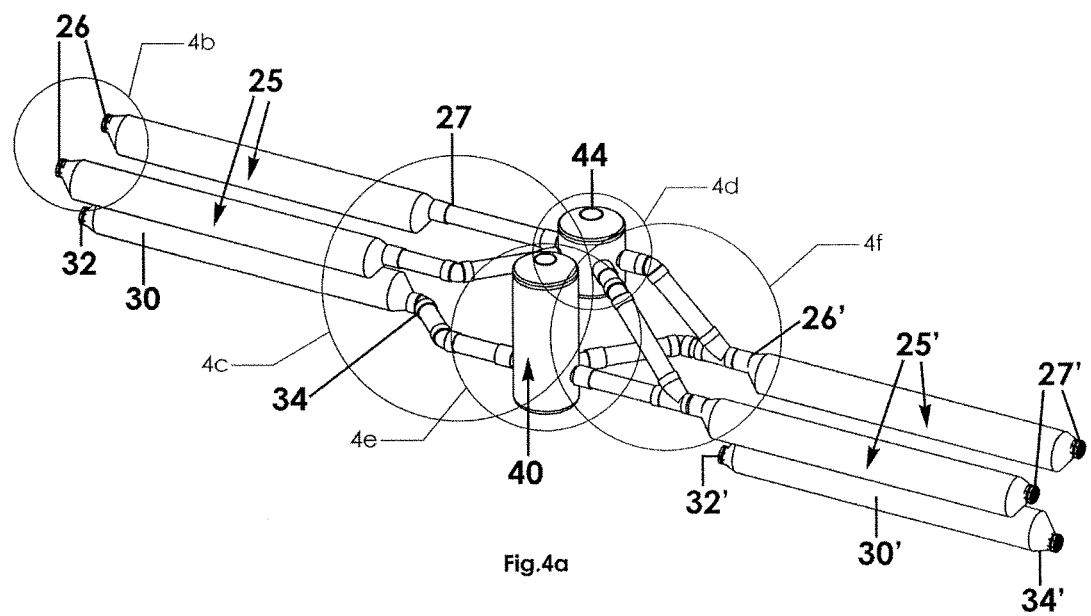
FIG. 4a is a perspective view of the distribution conduits and flow meters removed from the trench members.
Figure 4B:
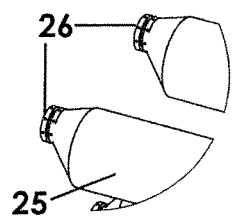
Figure 4C:
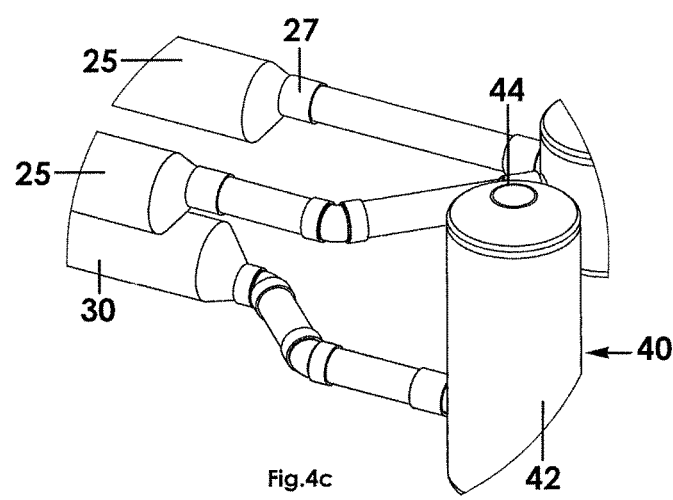
Figure 4D:
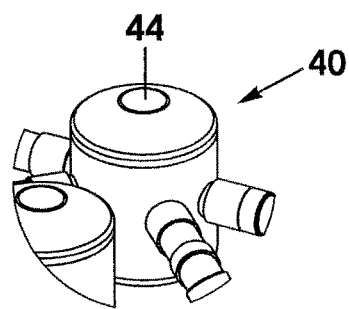
Figure 4E:
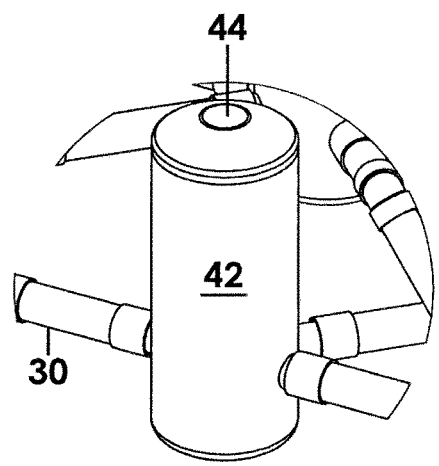
Figure 4F:
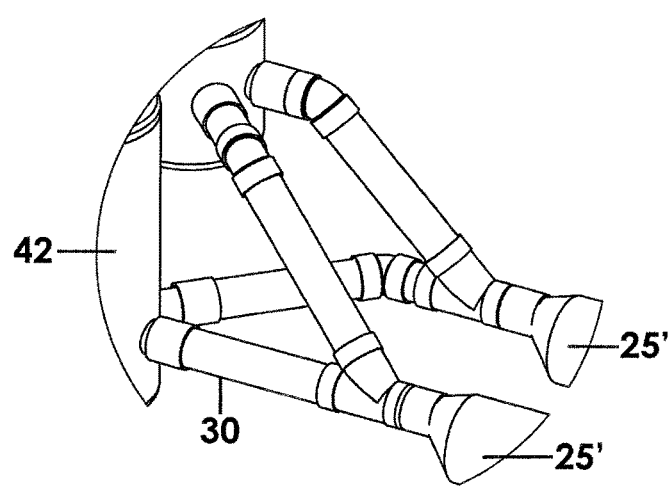

A gravity induced soil remediation system according to a preferred embodiment of the present invention will now be described with reference to FIGS. 1 to 4f of the accompanying drawings. The gravity induced soil remediation system 10 includes an upstream trench member 20, a downstream trench member 20', and respective distribution conduits configured in a consistently negative elevation arrangement so as to filter waste from the waste stream as described in more detail below. It is understood that the components of the soil remediation system 10 are installed below the surface 12 of the ground except as otherwise described below.

The upstream trench member 20 includes an upstream end 22 and an opposed downstream end 24. The upstream trench member 20 may include a bottom wall 36 and upstanding side walls extending upwardly from the bottom wall such that, together, the walls define an interior area. The bottom wall 36 and side walls 38 of the upstream trench member 20 may be constructed of an impermeable material such that liquid, such as water, situated in the interior area is captive and not allowed to leak out, such as into the surrounding soil or environment. The upstream trench member 20 may also include a removable top wall 37 that selectively limits access to the interior area.

A first distribution conduit 25 is positioned in the interior area of the upstream trench member 20, the first distribution conduit 25 having a tubular configuration. The first distribution conduit 25 includes a first conduit inlet 26 upstream of the upstream end 22 of the upstream trench member 20 and an opposed first conduit outlet 27 downstream of the downstream end 24 of the upstream trench member 20. Preferably, the first conduit inlet 26 is in fluid communication with a source of the waste stream. For instance, the first conduit inlet 26 may be connected to a reservoir, pipeline, gutter, truck reservoir, run-off area or other receptacle containing a waste stream to be filtered. The waste stream, then, is able to flow through the first distribution conduit.

The first distribution conduit 25 has a negative elevation angle, i.e. a downward slope, between the first conduit inlet 26 and the first conduit outlet 27 such that the waste stream flows downwardly between the first conduit inlet 26 and first conduit outlet 27 by the natural force of gravity. In other words, the waste stream flows in a downward direction within the first distribution conduit 25 within the upstream trench member 20 with assistance from a pump, a motor, or other source of pressure or compulsion. Preferably, the downward slope (negative elevation angle) of the first distribution conduit is at least 3%.

Further, the first distribution conduit 25 includes an outer wall 28 defining a plurality of perforations 29 or apertures configured to allow a first portion of the waste stream to pass therethrough, i.e. to exit out of the first distribution conduit 25 and into the interior area surrounding the first distribution conduit 25. Preferably, the perforations 29 have a dimension that only allow a relatively small portion of the liquid waste stream to pass into the interior area while most of the waste stream continues to flow downstream as will be described later. In an embodiment, the first distribution conduit 25 may be surrounded by a semi-porous flexible sleeve 25a that is configured to also allow a portion of the waste stream to pass into the interior area while preventing sand or filter media in the interior area to infiltrate or clog up the perforations 29 of the first distribution conduit 25. It is understood, however, that the combination of the first distribution conduit 25 and the sleeve 25a will be referred to in the description and drawings collectively as the first distribution conduit 25.

The upstream trench member 20 may include sand and carbon filter media 34 situated within the interior area. The sand and filter media 34 is positioned between the first distribution conduit 25 and the bottom wall 36 of the upstream trench member 20 and, in an embodiment, may surround the first distribution conduit 25. The carbon filter media 34 may be distributed or layered through the interior area or, in an embodiment, may be applied directly to the outer wall 28 of the first distribution conduit 25 adjacent respective perforations 29. The carbon filter media 34 is configured to extract, filter, absorb, or bio-digest waste material from the first portion of the waste stream that passes through the perforations 29 of the first distribution conduit 25. Digestion of waste material by the carbon filter media refers to conversion of the waste to a gas or a gas-water mixture. In the present system, no pressure needs to be applied to force the waste stream through the filter media 34 or to apply the filter media 34 to the waste stream. Instead, the system 10 is configured such that portions of the waste stream pass by the natural force of gravity through the filter media.

The soil remediation system 10 includes a first collector conduit 30 situated in the interior area of the upstream trench member 20 and being displaced downwardly from the first distribution conduit 25. The first collector conduit 30 includes a first collector inlet 32 configured to receive a filtered remainder of the first portion of the waste stream having trickled through said sand and carbon filter media 34. The first collector inlet 32 is in fluid communication with the interior of the upstream trench member 20 proximate the bottom wall 36 thereof. As described above, the bottom wall 36 and side walls 38 of the upstream trench member 20 are impermeable such that the filtered remainder of the first portion of the waste stream is captive and pools near respective walls as it passes through the sand and filter media 34 and is received into the first collector inlet 32 of the first collector conduit 30. The first collector conduit 30 also includes a first collector outlet 34 opposite and downstream from the first collector inlet 32, the first collector outlet 34 being downstream from the downstream end 24 of the upstream trench member 20. The first collector conduit 30 defines a negative elevation, i.e. downward slope, between the first collector inlet 32 and the first collector outlet 34 such that the filtered remainder of the waste stream flows by the force of gravity therethrough. Preferably, the downward slope (negative elevation angle) of the first collector conduit is at least 3%.

It is understood that the first distribution conduit 25 described above may actually be a pair or plurality of spaced apart first distribution conduits 25 so as to convey a larger volume of a waste stream through the system 10. Similarly, more than a single first collector conduit 30 may be included as well.

The soil remediation system 10 may include a downstream trench member 20' also situated below the ground surface and positioned downstream from the upstream trench member 20. In fact, a series of downstream trench members 20' may follow the upstream trench member 20, each being situated at an elevation lower than the most adjacent upstream trench member 20. The downstream trench member 20' includes a construction and configuration substantially similar to the construction and configuration of the upstream trench member 20 described above except as specifically noted below. Therefore, primed reference numerals will be used in the figures to refer to the same or substantially similar structures and the particular constructions and configurations will not be detailed again here. For instance, the downstream trench member 20' includes a second distribution conduit 25', second collector conduit 30', and secondary bottom wall 36' and side walls 38', amongst other similar structures.

The downstream trench member 20' is in fluid communication with the upstream trench member 20 such that the waste stream, having passed first through the upstream trench member 20, is then passed through the downstream trench member 20' for more filtration in the manner described above. Specifically, the second distribution conduit 25' includes a second conduit inlet 26' in fluid communication with the first conduit outlet 27 of the first distribution conduit 25. Similarly, the second collector conduit 30' includes a second collector inlet 32' in fluid communication with the first collector outlet 34 such that the filtered remainder flows on to the second distribution conduit 25' for further filtration. Again, the second distribution conduit 25' may include a pair or plurality of second distribution conduits 25' so as to facilitate a greater volume of fluid flow.

In the manner described previously, the second distribution conduit 25' includes a plurality of perforations 29' configured such that a second portion of the waste stream is allowed to pass into the interior area of the downstream trench member 20' where dissolved waste is again filtered and extracted by carbon filter media. A filtered remainder is again funneled into a second collector conduit 30' and conveyed to a next downstream trench member. The conduits of the downstream trench member 20' include negative elevation angles so that the waste stream flows downstream and a portion thereof flows downwardly to active respective filter media within the downstream trench member 20'.

In another aspect, the soil remediation system 10 includes a monitoring well 40 having a body portion situated beneath the ground surface and that is in communication with the first conduit outlet 27 of said first distribution conduit 25. The body portion 42 is also in fluid communication with the second conduit inlet 26' of the second distribution conduit 25'. The monitoring well 40 is configured to calculate a flow rate of the waste stream flowing through the monitoring well 40 and other statistics useful to the persons or organization seeking to filter the waste stream and remediate the environment. Preferably, the body portion 42 includes an access portal 44 configured to allow user access to the waste stream flowing through the body portion 42.

In use, the soil remediation system 10 may be installed under a surface of the ground near an area where there is run-off of liquid containing dissolved solid waste, such as near an airport where propylene glycol has contaminated the soil or waste water. A series of trench members may be installed within a trench where each trench member is positioned at an elevation lower that a previous trench member so that a contaminated waste stream will flow downwardly over activated carbon filter media by the force of gravity. After repeated filtration in this manner and as described above, the waste stream can be substantially if not completely cleaned. Then, the extracted waste material may be removed from each trench member for use or disposal. Alternatively, the carbon filter media may be configured to "digest" the waste and be ready for use again and again.

It is understood that while certain forms of this invention have been illustrated and described, it is not limited thereto except insofar as such limitations are included in the following claims and allowable functional equivalents thereof.

The invention claimed is:

1. A gravity induced soil remediation system installed beneath a ground surface for filtering dissolved solid waste material from a waste stream, comprising:

an upstream trench member having an upstream end and an opposed downstream end and defining an interior area;
a first distribution conduit situated in said interior area, said first distribution conduit having a first conduit inlet in fluid communication with a source of the waste stream and a first conduit outlet extending downstream from said downstream end of said upstream trench member;
wherein:
said first distribution conduit has a negative elevation angle between said first conduit inlet and said first conduit outlet such that the waste stream flows downwardly between said first conduit inlet and said first conduit outlet by the natural force of gravity;
said first distribution conduit includes a bottom wall defining a plurality of perforations configured to allow a first portion of the waste stream therein to pass therethrough;
said upstream trench member includes sand and carbon filter media situated in said interior area of said upstream trench member proximate said first distribution conduit, said sand and carbon filter media configured to extract the dissolved waste material from the first portion of the waste stream.

2. The soil remediation system as in claim 1, further comprising a first collector conduit situated in said upstream trench member displaced downwardly from said first distribution conduit, said first collector conduit having a first collector inlet configured to receive a filtered remainder of the first portion of the waste stream having trickled through said sand and carbon filter media.

3. The soil remediation system as in claim 2, wherein said upstream trench member includes a bottom wall and a plurality of side walls extending upwardly from peripheral edges of said bottom wall, said bottom and said side walls having an impermeable construction through which said filtered remainder of the first portion of the waste stream is not allowed to pass.

4. The soil remediation system as in claim 1, wherein said negative elevation angle is at least 3%.

5. The soil remediation system as in claim 1, further comprising:

a downstream trench member having an upstream end and an opposed downstream end and defining an interior area;
a second distribution conduit situated in said interior area of said upstream trench member, said second distribution conduit having a second conduit inlet in fluid communication with said first conduit outlet and a second conduit outlet extending downstream from said downstream end of said downstream trench member;
wherein said second distribution conduit has a negative elevation angle between said second conduit inlet and said second conduit outlet such that the waste stream flows downwardly between said second conduit inlet and said second conduit outlet by the natural force of gravity.

6. The soil remediation system as in claim 5, wherein said first and second distribution conduits, together, define a negative elevation angle between said first distribution conduit outlet and said second distribution conduit inlet such that the waste stream flows downwardly between said first distribution conduit and said second distribution conduit.

7. The soil remediation system as in claim 6 wherein said negative elevation angle between said first distribution conduit outlet and said second distribution conduit inlet is at least 3%.

8. The soil remediation system as in claim 5, further comprising:
- a first collector conduit situated in said upstream trench member displaced downwardly from said first distribution conduit, said first collector conduit having a first collector inlet configured to receive a filtered remainder of the first portion of the waste stream having trickled through said sand and carbon filter media, said first collector conduit having a first collector outlet downstream of said first collector inlet;
- wherein said second distribution conduit inlet is in communication with said first collector outlet so as to receive said filtered remainder of the first portion of the waste stream;
- said first collector conduit and said second distribution conduit defining a negative elevation angle therebetween so that said filtered remainder of the first portion of the waste stream flows downwardly into said second distribution conduit.

9. The soil remediation system as in claim 5, wherein:
- said second distribution conduit includes a bottom wall defining a plurality of perforations configured to allow a second portion of the waste stream therein to pass therethrough;
- said downstream trench member includes sand and carbon filter media situated in said interior area of said upstream trench member surrounding said first distribution conduit, said sand and carbon filter media configured to extract the dissolved waste material from the second portion of the waste stream.

10. The soil remediation system as in claim 9, further comprising a second collector conduit situated in said downstream trench member displaced downwardly from said first distribution conduit, said first collector conduit having a second collector inlet configured to receive a filtered remainder of the second portion of the waste stream having trickled through said sand and carbon filter media in said downstream trench member.

11. The soil remediation system as in claim 1, wherein said first distribution conduit may include a pair of spaced apart first distribution members situated in said upstream trench member, each one of said pair of first distribution members having an inlet and outlet, respectively.

12. The soil remediation system as in claim 5, wherein said second distribution conduit may include a pair of spaced apart second distribution members situated in said downstream trench member, each one of said pair of second distribution members having an inlet and outlet, respectively.

13. The soil remediation system as in claim 1, further comprising a monitoring well having a body portion situated beneath the ground surface and in communication with said outlet of said first distribution member, said monitoring well being configured to calculate a flow rate of the waste stream flowing therethrough, said body portion having an access portal configured to allow user access to the waste stream flowing through the body portion.

14. The soil remediation system as in claim 5, further comprising a monitoring well having a body portion situated beneath the ground surface and in communication with said outlet of said first distribution member and with said inlet of said second distribution member, said monitoring well being configured to calculate a flow rate of the waste stream flowing therethrough, said body portion having an access portal configured to allow user access to the waste stream flowing through the body portion.

15. The soil remediation system as in claim 1, wherein said filter media is coated on an outside surface of said first distribution conduit adjacent said plurality of perforations so as to filter said first portion of the waste stream passing through said plurality of perforations.

16. The soil remediation system as in claim 1, wherein solid waste extracted in said upstream trench member by said carbon filter media is removable from said interior area of said upstream trench member.

17. The soil remediation system as in claim 1, wherein said carbon filter media is configured to bio-digest the solid waste extracted in said upstream trench member such that the extracted solid waste is converted to one of a gas or a gas-water mixture.

* * * * *